(12) United States Patent
De La Vega

(10) Patent No.: US 10,958,961 B2
(45) Date of Patent: *Mar. 23, 2021

(54) SYSTEM AND METHOD FOR A REAL TIME STREAMING VIDEO PLATFORM

(71) Applicant: Gabriel De La Vega, Las Vegas, NV (US)

(72) Inventor: Gabriel De La Vega, Las Vegas, NV (US)

( * ) Notice: Subject to any disclaimer, the term of this patent is extended or adjusted under 35 U.S.C. 154(b) by 141 days.

This patent is subject to a terminal disclaimer.

(21) Appl. No.: 16/234,218

(22) Filed: Dec. 27, 2018

(65) Prior Publication Data

US 2019/0132631 A1   May 2, 2019

Related U.S. Application Data

(63) Continuation of application No. 10/911,144, filed on Aug. 4, 2004, now Pat. No. 10,205,986.

(60) Provisional application No. 60/493,898, filed on Aug. 8, 2003.

(51) Int. Cl.
| | | |
|---|---|---|
| G06Q 30/00 | (2012.01) | |
| H04N 21/4143 | (2011.01) | |
| H04N 7/173 | (2011.01) | |
| H04N 7/18 | (2006.01) | |
| H04N 21/2187 | (2011.01) | |
| H04N 21/2543 | (2011.01) | |
| H04N 21/4223 | (2011.01) | |
| H04N 21/462 | (2011.01) | |
| H04N 21/4782 | (2011.01) | |
| H04N 21/61 | (2011.01) | |
| H04N 21/658 | (2011.01) | |

(52) U.S. Cl.
CPC ..... *H04N 21/4143* (2013.01); *H04N 7/17318* (2013.01); *H04N 7/181* (2013.01); *H04N 7/185* (2013.01); *H04N 21/2187* (2013.01); *H04N 21/2543* (2013.01); *H04N 21/4223* (2013.01); *H04N 21/4622* (2013.01); *H04N 21/4782* (2013.01); *H04N 21/6125* (2013.01); *H04N 21/6581* (2013.01)

(58) Field of Classification Search
None
See application file for complete search history.

(56) References Cited

U.S. PATENT DOCUMENTS

| 7,106,360 B1 * | 9/2006 | Frederick | H04N 7/17318 348/143 |
| 2003/0229900 A1 * | 12/2003 | Reisman | H04N 21/42204 725/87 |

* cited by examiner

*Primary Examiner* — Mila Airapetian
(74) *Attorney, Agent, or Firm* — Christopher Mayle; Thomas E. LaGrandeur; Bold IP, PLLC

(57) ABSTRACT

A system and method of broadcasting images in a communications network. Methods according to the invention include providing image content from at least one mobile content provider, coupling the image content from the mobile content provider to a network, presenting the image content from the mobile content provider for selection, and selecting the image content from the mobile content provider.

18 Claims, 8 Drawing Sheets

SYSTEM AND METHOD FOR A REAL TIME STREAMING VIDEO PLATFORM

CROSS REFERENCE TO RELATED APPLICATIONS

This application is a continuation of U.S. patent application Ser. No. 10/911,144, filed on Aug. 4, 2004, which claims priority to a prior-filed provisional application Ser. No. 60/493,898, filed on Aug. 8, 2003.

FIELD OF THE DISCLOSURE

The invention relates generally to the field of network broadcasting and streaming video. More specifically, embodiments of the invention relate to systems and methods that couple mobile streaming video over unguided media to a network for viewer selection.

BACKGROUND

Today, video technology is omnipresent in both home and business. From video conferencing in the work environment, to store surveillance, to video taping family events, video technology has become commonplace. For recordation, video surveillance has taken to the roads in law enforcement applications. For police rushing to the scene of a crime or traffic accident, a patrol car mounted camera, microphone and recorder allow law enforcement to memorialize the event for evidentiary purposes. However, these systems do not typically allow for events to be shared in real time with other viewers. While law enforcement video and audio capture serve a limited role in preserving evidence, public applications of real-time mobile video can also benefit law enforcement; provide general information pertaining to road systems, as well as entertainment. The systems employed in law enforcement applications lack many of the conveniences and speed offered by computer-based systems for enterprise applications.

SUMMARY

Although there are systems for providing network broadcasting, an easily and broadly accessible system operable to subscribe to a plurality of mobile video content providers for providing content for a plurality of users to select from is not available. Such a system would allow a plurality of users to access a network and select from a plurality of available video content. The inventor has discovered that it would be desirable to have a system and method that subscribes to video content provided by mobile sources for view.

One aspect of the invention provides a method for broadcasting images in a communications network. Methods according to this aspect of the invention include providing image content from at least one mobile content provider, coupling the content from the mobile content provider to a network, presenting the image content from the mobile content provider for selection, and selecting the content from the mobile content provider.

Other objects and advantages of the features of the invention will become apparent to those skilled in the art after reading the detailed description of the preferred embodiment

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

Figure 1:
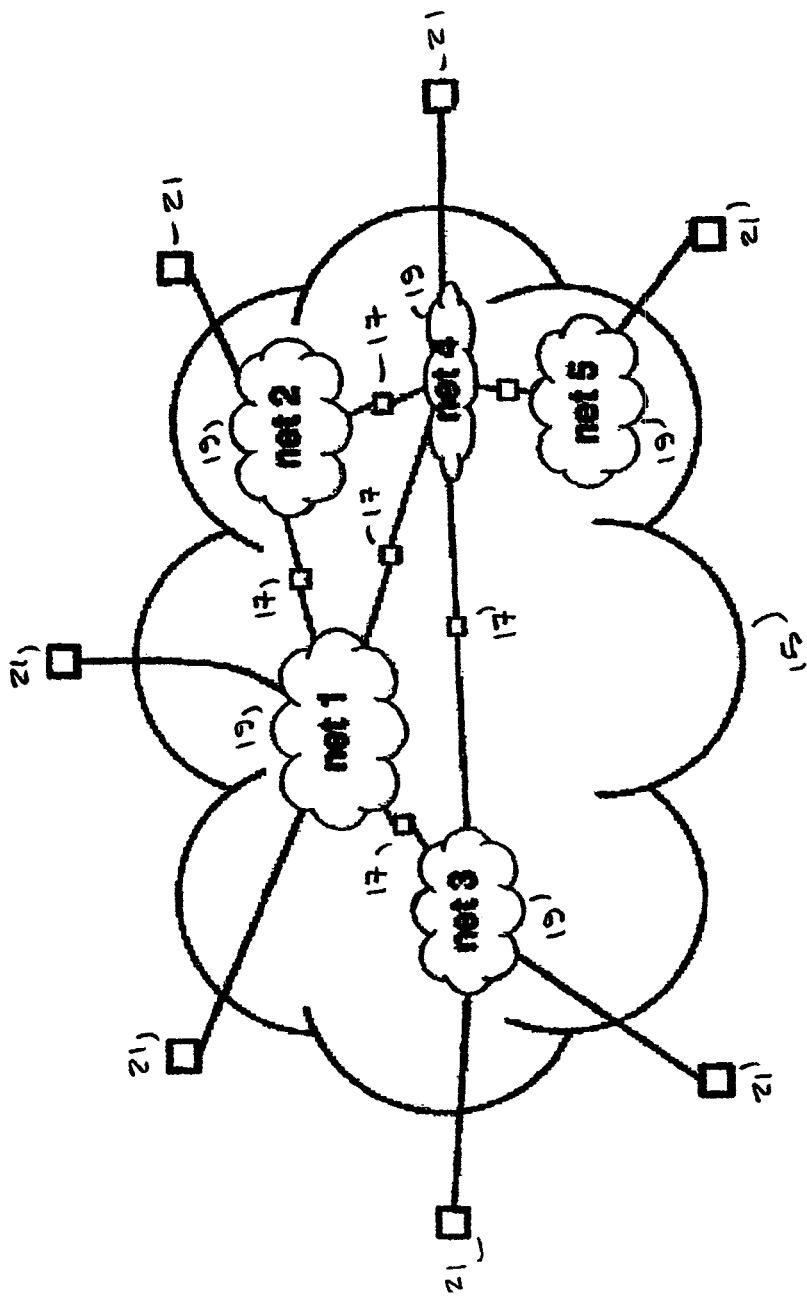
FIG. 1 is an exemplary diagram of the Internet.

In the Summary above, in this Detailed Description, the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined).

The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected," and "coupled" are not restricted to physical or mechanical connections or couplings.

It should be noted that the invention is not limited to any particular software language described or that is implied in the figures. One of ordinary skill in this art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

In one embodiment, the system and method of the invention is a client/server model deploying a two-tiered distributed application that provides network access to real-time streaming video (with or without audio content) content over unguided media for a user (client) to view. All forms of data transmission require a physical layer. The purpose of the physical layer is to convey data from one location to another over a communication channel that constitutes the physical transmission medium. Physical transmission media are typically grouped into guided media, such as copper wire and fiber optics, and unguided media such as radio and lasers. Preferably, the system and method include a plurality of mobile video content providers coupled to a network over unguided media providing content to a server for a user to select from. In this client/server model, embodiments of the invention provide a computer-readable media application split into a front-end client component and a back-end server component. The server component can be mobile, coupled to at least one camera, or at a fixed location coupled to the network and receiving video content from a plurality of video content providers.

The front-end client component of the invention is executed on stationary or portable computers coupled to a network over guided or unguided media and receives data from the server or input by a user. The user accesses a homepage and chooses from a plurality of video content to view. Viewing can be implemented on a pay-per-view basis after a selection is performed, such as block of time billing, per-minute billing, membership billing, wholesale/unlimited use billing, or other billing methods. The client component sends information to the hosting server usually in the form of a request. Network communications between the clients and server, and server and video providers can be by a LAN (Local Area Network) or the Internet, accessed using a cable modem, dial-up modem, wireless modem, DSL (Digital Subscriber Line) or other computer communication technique known to those skilled in the art.

The back-end server component of the invention receives data in the form of streaming video content subscribed to from a plurality of video content providers using, for example, a provider's URL (Universal Resource Locator) or other network location as the originating address. A video content provider can also function as a client, accessing image content provided by another video content provider. The content providers log in/out activity is date and time stamped for remuneration if desired. The server presents content from each subscribed to video provider on a home page, acknowledges a clients' request, and couples selected content to the client. Clients receive the information returned from the server and present it to the users by way of its user interface or GUI (Graphic User Interface). Most of the processing is performed at the back-end (server end) data center where messaging servers, application servers, database servers and other resources are located.

The invention is executed preferably on a server, either fixed or mobile, using guided or unguided media to couple with its client counterparts (users) and video content providers. Networks allow more than one user to work together and share resources with one another.

The capability of individual computers being linked together as a network is familiar with one skilled in the art. Network architectures vary for LANs (Local Area Networks), WANs (Wide Area Networks), WLANs (Wireless Local Area Network), WWANs (Wireless Wide Area Network) and networks that use terminals to connect to mainframes. Two physical networks can be connected by a router, which has a separate interface for each network connection. Computers attach to each network. A larger Internet can be formed by using three routers to interconnect four physical networks.

One of the largest collections of existing networks is the Internet, which includes backbones, regional networks, and LANs. The Internet concept, as shown in FIG. 1, is the illusion of a single network 15 that TCP/IP (Transmission Control Protocol/Internet Protocol) software provides to users and applications. The underlying physical structure of the Internet 15 is where a computer 21 attaches to one physical network 15 and routers 17 interconnect individual networks 19. The physical structure or layer can be guided or unguided media.

TCP views IP as a mechanism that allows TCP software on a host, to exchange messages with TCP software on a remote host. This model refers to the users as clients and the overall arrangement as a client server model. The client and server use TCP/IP protocols to communicate across an Internet. The client and server each interact with a protocol in a higher layer known as the transport layer. The transport layer provides data transport from the source device to the destination device, independent of the network 19 or networks 15 used.

Figure 2:
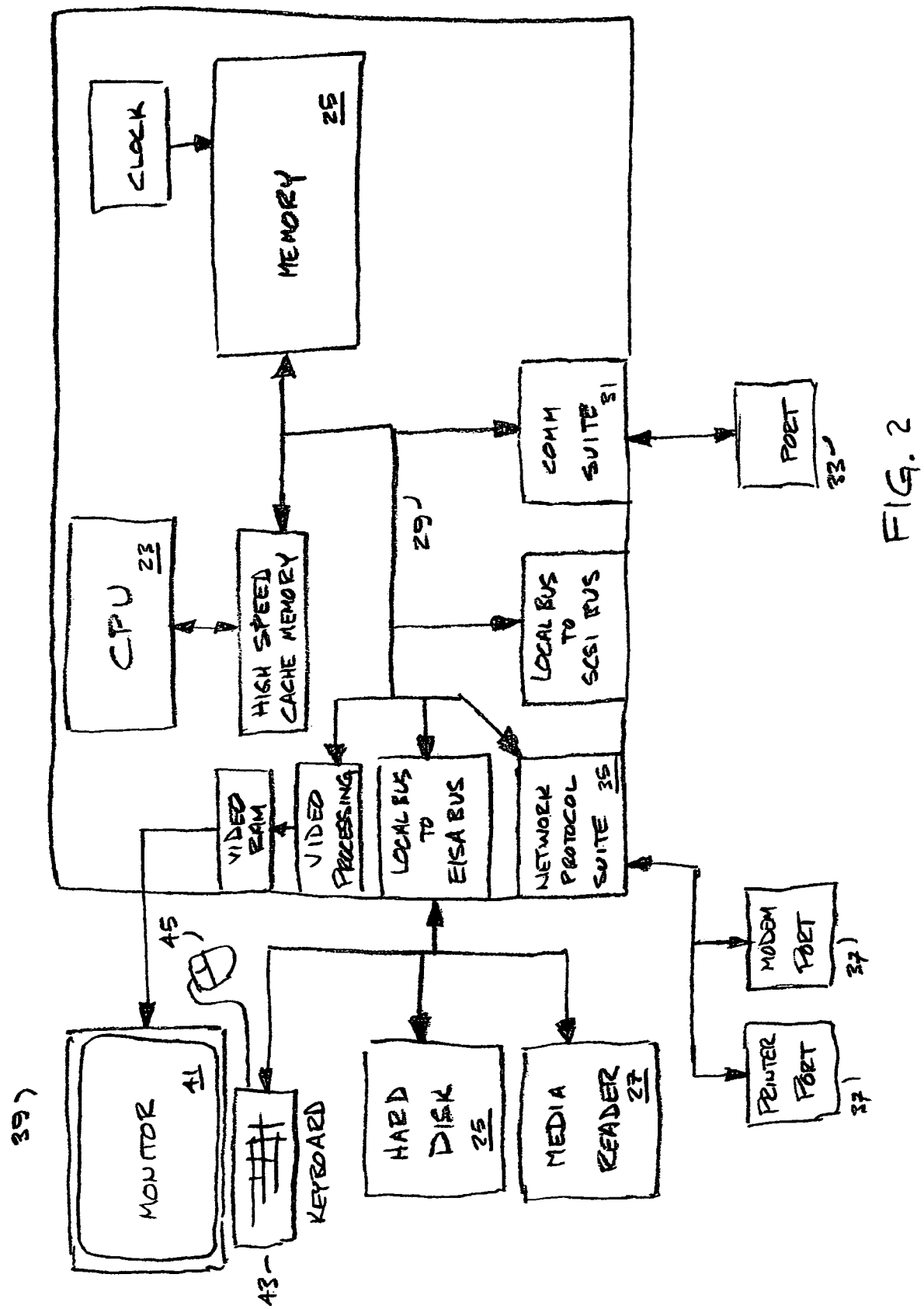
FIG. 2 is a block diagram of an exemplary computer.

An embodiment of a computer 21 executing the instructions of one embodiment of the invention is shown in FIG. 2. The computer 21 can execute the client, server, or video content provider component instructions. A representative hardware environment is depicted which illustrates a typical hardware configuration of a computer. Each computer 21 includes a CPU 23, memory 25, and a reader 27 for reading computer executable instructions on computer readable media, a common communication bus 29, a communication suite 31 with external ports 33, a network protocol suite 35 with external ports 37 and a GUI 39. The communication bus 29 allows bi-directional communication between the components of the computer 21. The communication suite 31 and external ports 33 allow bi-directional communication between the computer 21, other computers 21, and external compatible devices such as laptop computers and the like using communication protocols such as EEE 1394 (FireWire or i.LINK), IEEE 802.3 (Ethernet), RS (Recommended Standard) 232, 422, 423, USB (Universal Serial Bus) and others.

The network protocol suite 35 and external ports 37 allow for the physical network connection and collection of protocols when communicating over a network. Protocols such as the TCP/IP suite, IPX/SPX (Internetwork Packet eXchange/Sequential Packet eXchange), SNA (Systems Network Architecture), and others. The TCP/IP suite includes IP (Internet Protocol), TCP (Transmission Control Protocol), ARP (Address Resolution Protocol), and HTTP (Hypertext Transfer Protocol). Each protocol within a network protocol suite has a specific function to support communication between computers on a network. The GUI 39 includes a graphics display such as a CRT, fixed-pixel display or others 41, a key pad, keyboard or touchscreen 43 and pointing device 45 such as a mouse, trackball, optical pen or others to provide an easy-to-use, user interface for the invention. The computer 21 can be a handheld device such as a PDA (Personal Digital Assistant), Blackberry device or conventional personal computer such as a PC, Macintosh, or UNIX based workstation running their appropriate OS (Operating System) capable of communicating with a computer over guided or unguided media. The CPU 23 executes compatible instructions or software stored in the memory 25. Those skilled in the art will appreciate that the invention may also be practiced on platforms and operating systems other than those mentioned.

Figure 3:
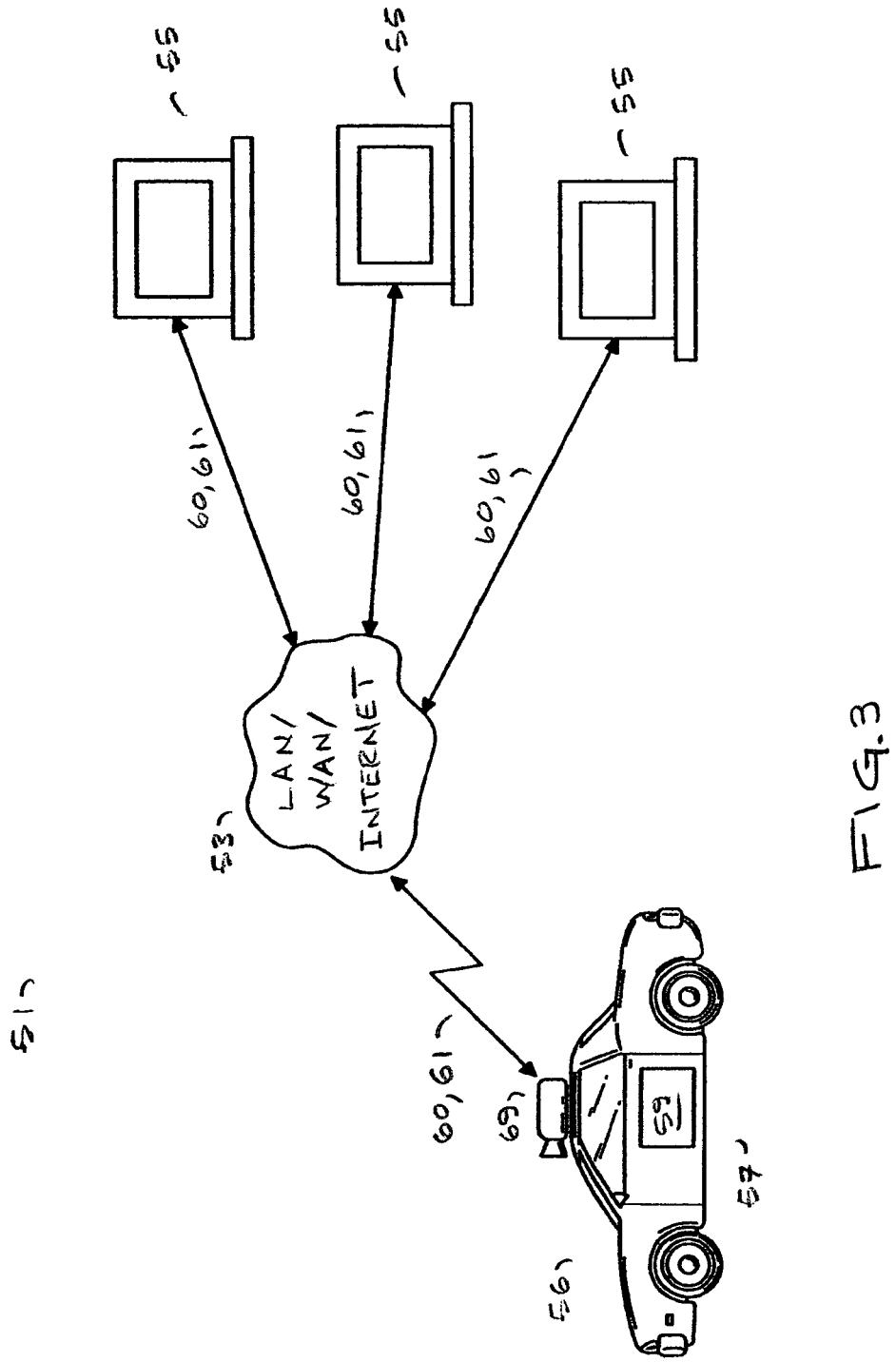
FIG. 3 is an exemplary system of the invention.

FIG. 3 illustrates an embodiment of the invention 51 for broadcasting and receiving information over a network 53. The system includes a network 53 having a plurality of clients 55 and at least one vehicle 57 with a mobile server 59. In the embodiment shown, the clients 55 and mobile content provider 56 server 59 communicate with each other over the network 53. The vehicle 57 is merely for illustrative purposes. In the embodiment shown, the vehicle 57 exemplifies that the mobile server 59 is supported by an individual, or moving or movable carrier. For example, the vehicle 57 can be an automobile, truck, train, ship, airplane, motorcycle, and others. The mobile server 59 can be a portable computer or PDA 21 operable to couple to the network 53 over unguided media 61. The mobile server 59 establishes an unguided media 61 connection with the network 53 using a wireless modem such as a Wi-Fi (Wireless Fidelity) card or an AirCard (not shown) coupled to the modem port 37 executing software such as Rhino Software FTP Voyager, for example.

Wi-Fi allows for a wireless network 53 connection. Wi-Fi enabled computers can send and receive data anywhere within the range of a Wi-Fi base station using IEEE 802.11x radio technology to provide secure, reliable, fast wireless connectivity. Wi-Fi networks can connect computers 21 to each other and to the Internet and wired networks 53 (which use IEEE 802.3 or Ethernet). Wi-Fi networks operate with data rates up to 54 Mbps or greater, and can provide performance comparable to 10BaseT Ethernet networks.

An AirCard allows for network 53 access using wireless cellular telephony. One example is the enhanced Sprint Nationwide PCS Network. The AirCard provides the mobile content providers 56 and clients 55 with instant access when using a high-speed wireless network 53 which delivers average data speeds ranging 50 to 144 kbps or greater. For example, a wireless AirCard allows connection to the Internet and fax via the PCMCIA slot of a PC and provides LAN-like connectivity with wireless access to email, intranet, corporate applications and full web browsing. As a result, the mobile content provider 56 or client 55 can instantly access an application on a laptop or other handheld device 21.

Wireless modems allow users to perform mobile networking whereby a user remains connected to a network 53 even though their point of attachment to the Internet 53 (a wireless access point or cellular tower) may change as the user's physical location changes. If a computer 21 is connected to the Internet 53 via a wireless modem to a cellular tower, it is important that the IP address does not change even as the computer 21 moves into an area that has coverage from a different cellular tower.

By way of cellular telephony background, as a user navigates throughout a cellular region, he is constantly "handed-off" between respective cellular towers as his location changes thereby maintaining a reliable connection. An IP address uniquely identifies the computer that is attached to that network and allows other computers to communicate with it. If his computer 21 connects to a new cell tower and its IP address changes during the process, it would no longer be able to receive the data that was being sent to its former address. This is a problem not only in wide area cellular networks, but also in wireless local area networks as users move from an area served by one wireless access point to another.

Mobile IP is a system designed to solve this problem by giving the user two IP addresses, called a home address and a care-of address. The home address is a unique IP address (that can be statically or dynamically assigned), located on the user's home network 53, while the care-of address is a new IP address that changes every time the mobile user connects to the network 53, and marks the location of their connection to the network. A mobile IP network also has a computer 21 known as the home agent. The home agent tracks the location of the mobile user and records the current care-of addresses where they are attached to the network 53. When data is sent to the mobile user it is sent to their home IP address (on their home network). If the mobile user is attached to a network 53 that is not its home network 53, the home agent forwards all data packets to the care-of address, which is where the mobile user is currently attached to the network 53. A mobile IP address acts as a forwarding service. The use of mobile IP on a network 53 allows users to have a unique IP address, for example, 10.10.10.10, that makes it appear that the mobile user is permanently connected to their home network 53, even though they may be traveling across different connection points and changing their IP address, for example, from 11.11.11.11 to 12.12.12.12. Each IP address consists of four bytes or octets.

To the fixed server or client 55, the mobile video content provider appears to have an unchanging address during the entire session, as they hand-off from one cellular tower to another while connected. Agents in mobile IP support software perform this function. The network 53 and wireless modems support the mobile IP agents to manage the IP address changes.

Figure 4:
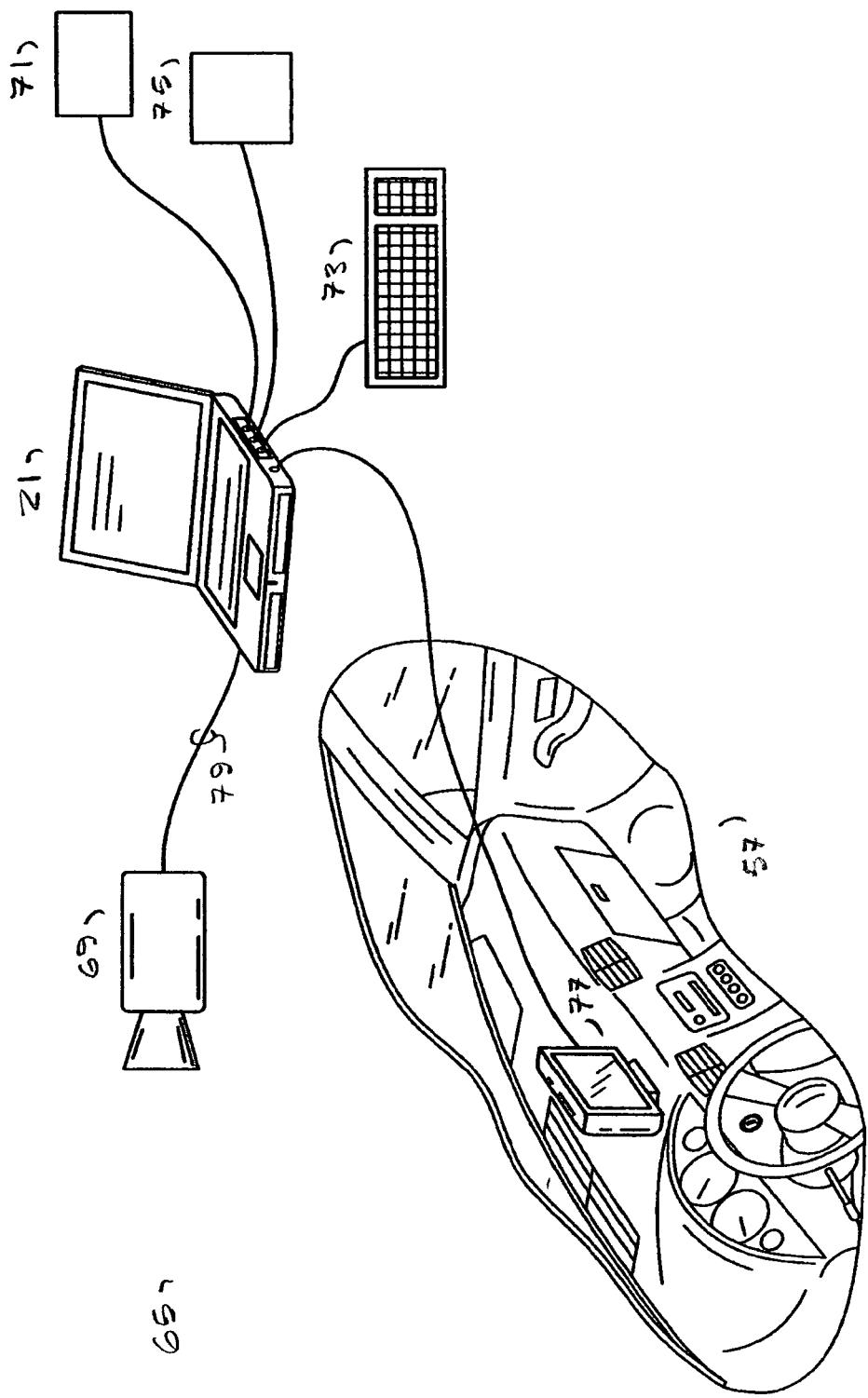
FIG. 4 is an exemplary video content provider subsystem.

The video content provider 56 subsystem 65 shown in FIG. 4 includes a camera 69 coupled to a networked 53 computer 21. The subsystem 65 can comprise individual components such as a camera 69, computer 21 with GUI 39, wireless modem or card 71, external keyboard 73, additional memory 75, external display 77, and other peripheral components, or packaged as a complete unit comprising all of the individual functionality (not shown). The camera 69 can be, an analog video camera (camcorder), a digital video camera, a digital still camera, or other technology capable of outputting 79 moving or still image content, as well as audio signals (microphone not shown) in a compatible video format such as, for example, JPEG (Joint Photographic Experts Group), GIF (Graphics Interchange Format) or MPEG (Motion Picture Experts Group) formats for coupling with a computer 21. The camera 69 is supported by the vehicle 57 such that the camera is operable to record images and/or audible signals from the interior of the vehicle 57, such as, for example, the view inside of the vehicle 57, the view out of the front windshield, the view out of the back glass, or other vehicle 57 placements offering a predetermined or adjustable view. In other embodiments, the camera is supported on the exterior of the vehicle 57 (as shown in FIG. 3) such that the camera 69 is positioned in predetermined or adjustable views from the exterior of the vehicle 57. For example, looking forward down the road traveled from the roof of the vehicle 57, or the POV (Point-Of-View) of a motorcycle operator, etc. In other embodiments, a plurality of cameras 69 can be employed for multiple views (including audio) to provide images and sound located in the interior and/or exterior of the vehicle 57.

The video content provider 56 computer 21 can function as a mobile server 59 or client 55. The mobile server 59 can store video (including audio) or still images captured by the camera(s) 69 in memory 25, 75 and process the signals for transmission over the network 53 using, for example, Windows Media Encoder which formats the video and audio signals for streaming delivery.

Streaming video sends live or archived video content to the network 53 that can be accessed with a computer 21. For access, Apple's QuickTime, Microsoft's Windows Media Player, Real Network's Real Player, or other software, and the URL (Universal Resource Locator) or address for the originating site is required. The faster the network 53 connection and computer 21 speed, the better the video will be. Audio is acceptable even with slower connection speeds.

Streaming video accepts sound, video or other medium file types, breaks them up into smaller pieces and forwards the pieces to their destination. The media is converted to a form readable by servers 59 and computers 21. For example, RealOne player is able to read a stream of smaller pieces as it arrives at a destination and begins playing each piece before the rest of the file arrives. To make playback smooth, RealOne player buffers the collections of data prior to being played.

To play a file, decoder software must be resident on the computer 21. One system is termed "on demand" where the file is read directly from the server 59 as it plays so there are no lengthy waits for huge memory consuming files to be downloaded before playing.

Network Web servers are typically stateless. A Web server accepts a request for information, and returns the information to a client 55 thereby completing the transaction, disconnects, and processes other requests by other users 55. The client 55 Web browser takes the information it receives and assembles it on the screen. However, moving images and sound are problematic. Unlike a graphic; video, animation, and sound are continuous in time. With the stateless approach, a Web user 55 would need to download the entire video clip before it can be viewed. But with the large file size that comes with even a short video clip, the wait becomes lengthy.

Streaming media overcomes the stateless connection by transferring data to the client (user) 55 as the media is viewed as a continuous connection. The client 55 receives the images or audio prior to viewing or hearing them. The file size of the clip becomes less of an issue.

Compression allows a modem 71 or network 53 to transfer the data. Streaming compression is a lossy compression method and removes unnecessary data making a given file size smaller allowing for easy access. A client 55 can reside in England and receive video content on-demand from Las Vegas, Nevada. Streaming media provides for a selling, informing, and educating multimedia Web experience.

Figure 5:
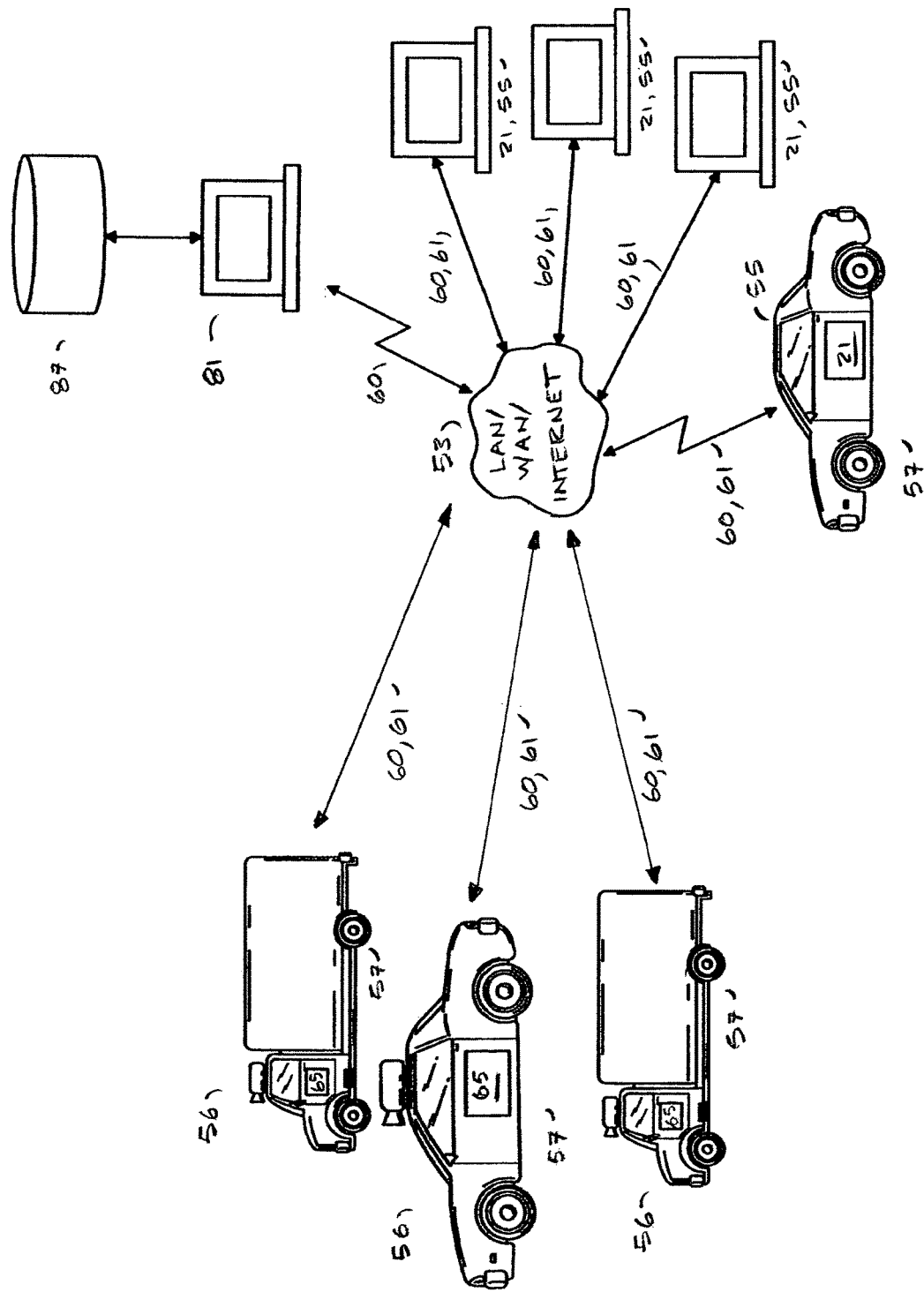
FIG. 5 is another exemplary embodiment of the invention.
Figure 6:
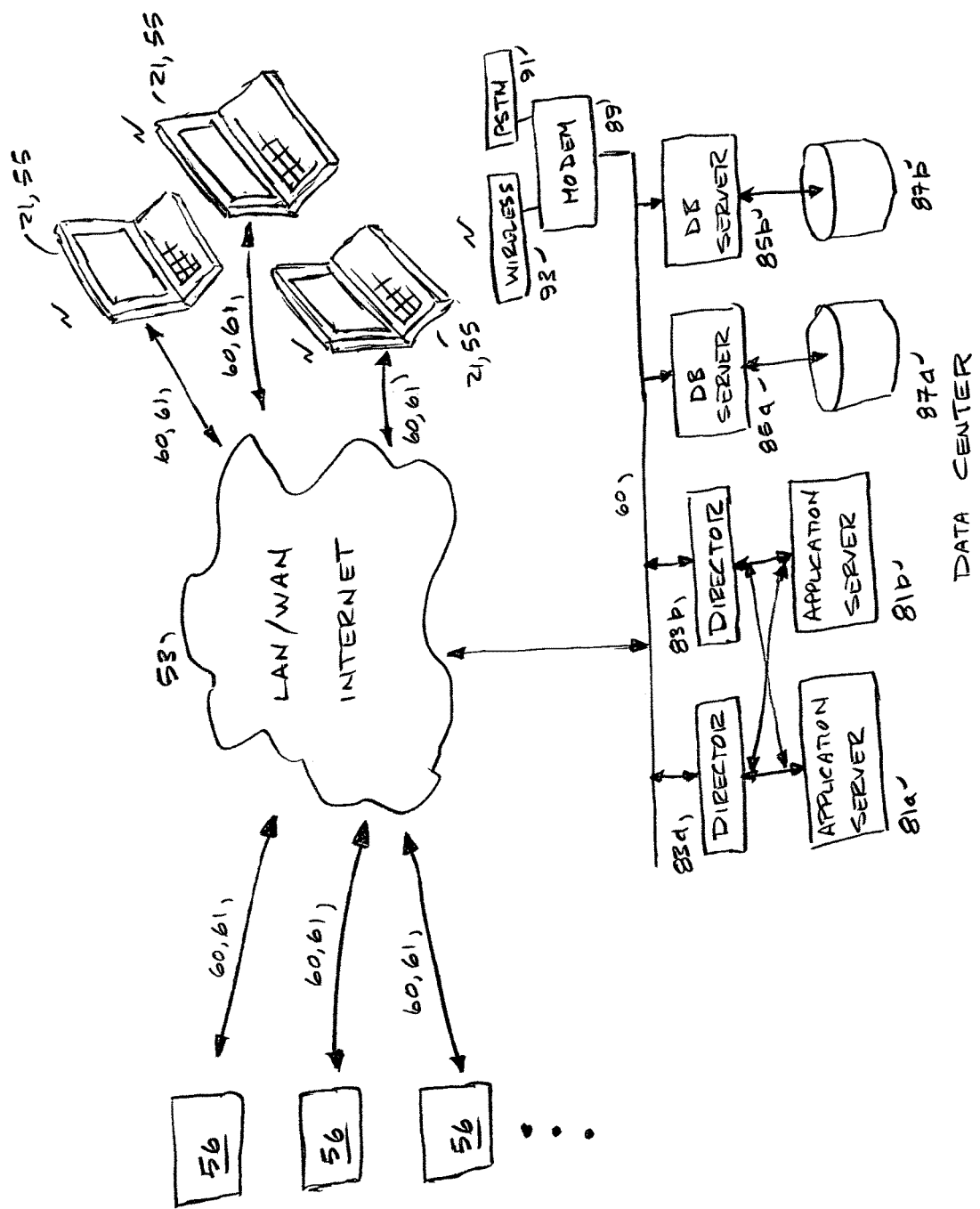
FIG. 6 is a diagram of an exemplary computer network.

FIGS. 5 and 6 illustrate another embodiment of the system for broadcasting information from a plurality of mobile content providers 56 over a network 53. In this embodiment, each video content provider 56 subsystem 65 provides video content to a fixed server 81 over the network 53. Each video content provider subsystem 65 can record the video (and audio) content.

The server 81 resides in a data center on two application servers 81a, 81b. The servers 81a, 81b are computers 21 running Microsoft Server 2000 or 2003 that host the server component of the invention. The invention can be deployed on any compliant application server. As one skilled in the art will recognize, other platforms and frameworks can be used along with application servers.

Clustering is a redundancy mechanism used to share data between two different application servers so each participant of the cluster can act as a standby in case one of the participants of the cluster crashes. Clustering achieves high availability and transparent switchover. The servers 81a, 81b are also load balanced using a hardware solution 83a, 83b for distributing the computing load among them. In one embodiment, the directors 83a, 83b are arranged in a master-standby configuration to ensure that the framework is not susceptible to a single point failure. This ensures that the application framework is available to the network 53 in case one of the switches fails. The servers 81a, 81b communicate with a clustered Windows database running on separate servers 85a, 85b using clustered RAID (Redundant Array of Independent Disks) 10 storage 87a, 87b. Clustering provides similar redundancy to avoid data unavailability in case one of the servers fails. Other database technologies such as Oracle can be used.

The network 53 is used to provide a communication path between the clients 55, servers 81a, 81b and video content providers 56 from any location. The video content providers 56 can communicate with the data center over guided media 60, such as Ethernet, when at a stationary location or over unguided media 61, such as cellular telephony, when mobile. Communications between the data center and clients 55 is over any of the aforementioned network 53 connections, or modem 89 coupled to a PSTN (Public Switched Telephone Network) 91 for hardwire or wireless 93 telephony connections.

The system 51 is built using Web-based technology. An Internet browser such as IE, or others, allows users 55 to view the presented video content. Individual clients 55 at a plurality of locations can communicate with a plurality of network 53 Web servers, which in turn communicate with the server 59, 81 hosting the application. A communication path is established between the browser (client 55) executed on a computer 21 and the server 59 through an ASP (Active Server Pages) application environment using IIS (Internet Information Server) Web servers. ASP is used to build distributed Web-based applications.

Figure 7A:
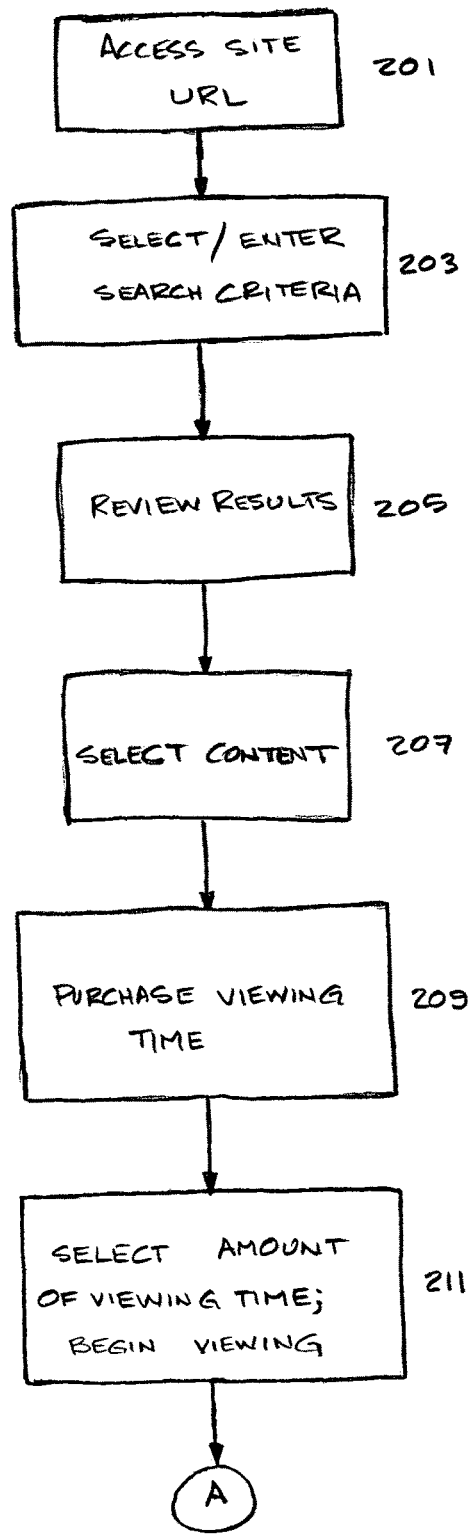
FIGS. 7a and 7b illustrate an exemplary method of the invention.
Figure 7B:
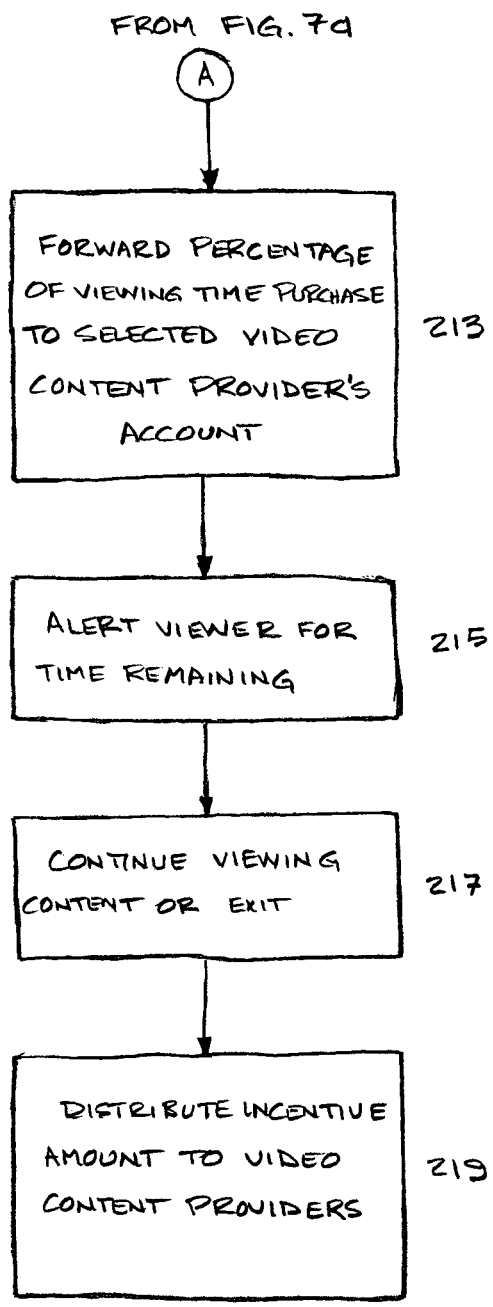

An exemplary method of the invention is show in FIGS. 7a and 7b. Using the pointing device 45, a user 55 opens a browser on a computer 21 coupled to a network 53 and accesses the application homepage URL (step 201) on the hosting server 59, 81. Using conventional GUI interface devices such as a title bar, toolbars, pull-down menus, tabs, scroll bars, context help, dialog boxes, operating buttons (icons) and status bar, the user navigates throughout the display. The display appears in the browser window with the toolbar. Toolbar buttons activate the functionality of the client 55. Toolbar buttons are active/inactive depending upon the tab and functionality presented in a view.

The video content subscribed to from video content providers 56 from a plurality of locations is presented on the homepage for selection by the user 55. The user can search for available video content based on various selection criteria (step 203) such as, for example, the name of a vehicle 57, the type of vehicle 57, the location of a vehicle 57 (country, state, etc.), the location of a camera 69 within the vehicle 57, with or without audio commentary, with or without corresponding audio content, etc. The search can yield results of presently available content, archived content, or content that will be available at predetermined times. Content found for selection (step 205) is displayed within separate windows or frames, or as a list depending on the amount of content found matching the specific search criteria. Some vehicles can include multiple media recorders, which offer additional selection.

To view the selected content (step 207), the invention employs a pay-per-view system. In one system, the user purchases tokens, with each token representing a predetermined block of time. The user purchases tokens using a credit card over a secure credit card connection from the hosting site (step 209). The purchased tokens are credited or debited in an account a user can establish, or can all be redeemed during one viewing session.

The user decides how much viewing time is desired for a selected video provider, and enters his time selection using a pull-down menu, or selects from a plurality of radio buttons denoting periods of time. The user is coupled to the selected video content and begins viewing the video streaming from his selected source (step 211). The elapsed viewing time is displayed for the user to see.

The purchasing system allocates a predetermined percentage of a token price to the selected video provider as remuneration with the remainder allocated as payment for the hosting site (step 213). The amount allocated for the video provider is credited to an account previously established by a video provider. For example, if one token cost $5 for 15 minutes of viewing time, 75% can automatically be debited from the hosting site and credited to the selected video provider's electronic account during the viewing session or at a later time. The video provider credit can also be sent using regular mail service. The remaining 25% is credited to the hosting site's account.

The user watches the selected content until the paid for viewing time expires, or can exit at anytime. As the paid-for viewing time becomes exhausted, the user is alerted (215) and can purchase additional tokens, or redeem previously purchased tokens that are noted under his account to maintain viewing (step 217).

As an additional incentive for providing video content, during preselected times, the amount of revenue collected by the hosting site can have a set distribution made to each provider, or to those providers that are more frequently subscribed to (step 219). The distribution can be a set percentage for all video providers based upon the amount of time they provided paid-for content, or the distribution can vary depending upon a scale of time. The distributions are automatically credited to a respective content provider's account.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for presenting streaming image content comprising:
    receiving real-time streaming image content captured by one or more cameras from at least one content provider;
    coupling said real-time streaming image content from said content provider to a network;
    presenting said real-time streaming image content from said content provider for selection over said network for viewing in real-time over said network wherein said network is the Internet; and
    providing selection criteria for filtering the real-time streaming image content, the selection criteria comprising at least one of a location, a name, a type, and an audio commentary.

2. The method according to claim 1 wherein the step of presenting further comprises providing selection criteria of said real-time streaming image content further comprising presenting real-time streaming image content that will later become available at predetermined times, wherein the viewer filters the real-time streaming image content that will be later become available at predetermined times by the selection criteria.

3. The method according to claim 2 further comprising presenting search results for real-time streaming image content using said selection criteria the real-time streaming image content that will later become available at the predetermined times.

4. The method according to claim 1 wherein said image content further includes audio.

5. The method according to claim 1 further comprising receiving a predetermined fee for a predetermined amount of viewing time for said selected real-time streaming image content wherein the amount of viewing time is predetermined by the content provider.

6. The method according to claim 5 further comprising paying a first percentage of said predetermined fee to the content provider providing said selected real-time streaming image content and a second percentage of said predetermined fee based upon a set of metrics wherein the set of metrics comprises at least one of frequency of provided real-time streaming image content, type of real-time streaming image content, amount of viewers of the content provider's real-time streaming image content, and the time the content provider provides said real-time streaming image content.

7. The method according to claim 6 further comprising paying said content provider providing said selected real-time streaming image content a second percentage of said predetermined fee based upon a viewing metric wherein the first percentage of the predetermined fee and the second percentage of the predetermined fee are deposited into an account previously established by the content provider.

8. A system for presenting streaming image content comprising:
    means for receiving real-time streaming image content output by a camera from at least one content provider;
    means for coupling said real-time streaming image content from said content provider camera to a network;
    means for presenting said real-time streaming image content from said content provider for selection for viewing in real-time over the network wherein said network is the Internet; and
    means for providing selection criteria for filtering the real-time streaming image content, the selection criteria comprising at least one of a location, a name, a type, and an audio commentary.

9. The system according to claim 8 wherein means for presenting further comprises means for providing selection criteria of said real-time streaming image content further comprising means for presenting real-time streaming image content that will be later become available at predetermined times, wherein the image content is filtered by the selection criteria.

10. The system according to claim 9 further comprising means for presenting search results for real-time streaming image content presented using said selection criteria real-time streaming image content that will later become available at the predetermined times.

11. The system according to claim 8 wherein said image content further includes audio.

12. The system according to claim 8 further comprising means for receiving a predetermined fee for a predetermined amount of viewing time for said selected real-time streaming image content obtaining one or more tokens to pay for an amount of viewing time for the selected real-time streaming image content, wherein the amount of viewing time is predetermined by the content provider.

13. The system according to claim 12 further comprising means for paying a first percentage of said predetermined fee to the content provider providing said selected real-time streaming image content and a second percentage of said predetermined fee wherein the second percentage is based upon a set of metrics wherein the set of metrics comprises at least one of frequency of provided real-time streaming image content, type of real-time streaming image content, amount of viewers of the content provider's real-time streaming image content, and time the content provider provides said real-time streaming image content.

14. A system for presenting selecting streaming image content comprising:
one or more processors configured to process real-time image content signals from at least one video camera as streaming data;
the one or more processors coupled to the Internet, the one or more processors configured to communicate with the Internet to retrieve and display, wherein to view selected image content requires payment of a predetermined fee for a predetermined amount of selected image content viewing time.

15. The system according to claim 14, further comprising a server coupled to the Internet, the server configured to host the real-time image content from the at least one content provider for selection, and configured to process the predetermined fee for a predetermined amount of viewing time for selected image content to allow viewing wherein one or more tokens pay for an amount of viewing time for the selected real-time streaming image content, wherein the amount of viewing time is predetermined by the content provider.

16. The system according to claim 15 wherein the one or more tokens are a form of digital currency to pay for an amount of viewing time for the selected real-time streaming image content.

17. The system according to claim 16 wherein a first percentage of the predetermined fee is paid to the content provider providing the selected real-time streaming image content and a second percentage of said predetermined fee wherein the second percentage is based upon a set of metrics wherein the set of metrics comprises at least one of frequency of provided real-time streaming image content, type of real-time streaming image content, and amount of viewers of the content provider's real-time streaming image content.

18. The system according to claim 17 wherein a second percentage of the predetermined fee is paid to a content provider providing selected real-time image content based upon a metric the first percentage of the predetermined fee and the second percentage of the predetermined fee are deposited into an account previously established by the content provider.

* * * * *